Jan. 15, 1963    G. BAUMANN    3,073,422
ELECTROMAGNETIC CLUTCH ARRANGEMENT
Filed April 25, 1961    3 Sheets-Sheet 1

INVENTOR
Gunter Baumann
By Michael S. Striker
Attorney

Jan. 15, 1963   G. BAUMANN   3,073,422
ELECTROMAGNETIC CLUTCH ARRANGEMENT
Filed April 25, 1961   3 Sheets-Sheet 2
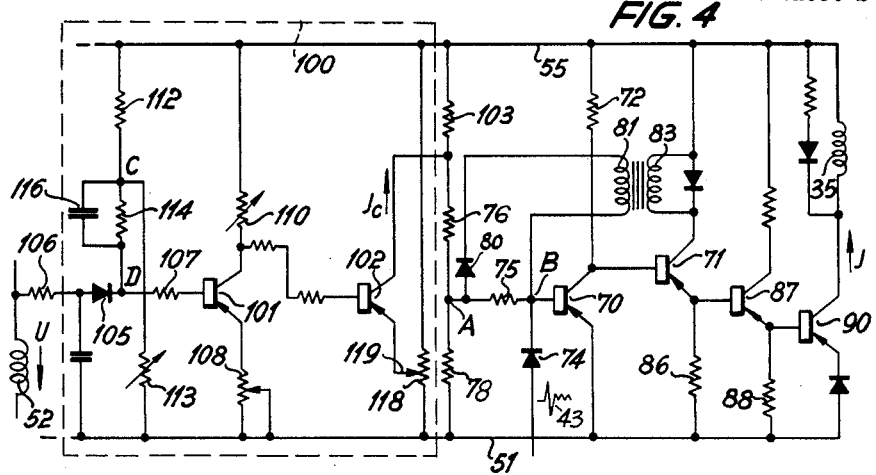
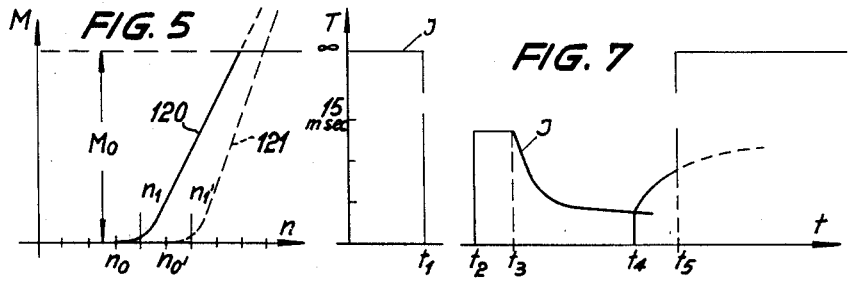
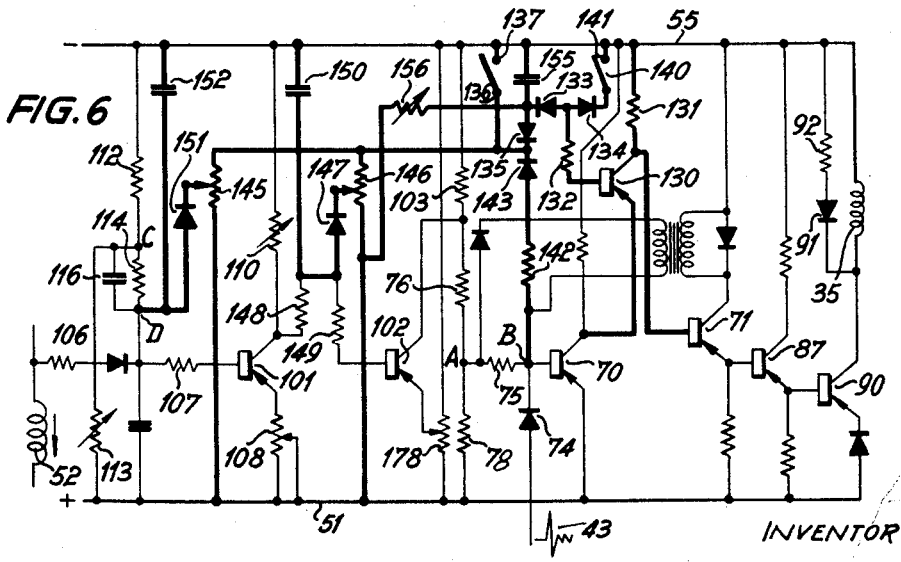
INVENTOR
Gunther Baumann
BY
Michael S. Striker
attorney

United States Patent Office

3,073,422
Patented Jan. 15, 1963

3,073,422
ELECTROMAGNETIC CLUTCH ARRANGEMENT
Gunther Baumann, Stuttgart, Germany, assignor to Robert Bosch G.m.b.H., Stuttgart, Germany
Filed Apr. 25, 1961, Ser. No. 105,336
Claims priority, application Germany May 5, 1960
25 Claims. (Cl. 192—.052)

The present invention concerns a clutch arrangement, and more particularly an electromagnetic clutch arrangement for engines in motor vehicles.

A clutch arrangement of this type must be capable of transmitting, after a minimum rotary speed is exceeded, a torque which increases with the increasing rotary speed of the engine and which, during the starting period of the engine or vehicle, obtains the energy required for the transmission of the torque in the form of electrical current pulses.

Clutches of this type must be so constructed that the torque transmitted at speeds which are only slightly greater than idling speed is smaller than the smallest torque that is required for the vehicle to be moved along a level road. This requirement partly interferes with the further requirement that the clutch must be capable of transmitting the full applied torque as soon as the rotary speed has increased to its so-called "no slip" value at which the torque is transmitted by the clutch without any slipping. This driving speed is desired to be not more than three times the speed at the start of the movement of the vehicle. Moreover it is desired to increase, in the case of a comparatively low temperature of the engine, the lowest starting speed which initiates the clutching action. The clutching action is then not initiated at the increased idling speed which is necessary at low temperatures of the engine. In addition, it has been found that it is desirable to regulate the electrical energy serving to actuate the clutching arrangement in a manner which depends upon the actual speed of the vehicle.

It is therefore a main object of this invention to provide for a clutch arrangement which is capable of satisfactorily dealing with the above mentioned partly conflicting requirements in a simple manner.

It is a further object of the invention to provide for an arrangement of this type which is composed of a comparatively small number of entirely reliable components.

With above objects in view the invention provides in an electromagnetic clutch arrangement including electromagnetically activable clutching members, one thereof being mounted on one, another one thereof being mounted on the other one of two rotatable members to be operatively connected, and adapted to transmit torque upon application of electric energy to at least one of said clutching members, the improvement consisting in the arrangement of electric pulse generator means connected to at least one of said electromagnetically activable clutching members for creating and supplying electric pulse sequences of varying pulse duration so as to energize the same to a degree depending upon the pulse duration of the pulse sequences applied.

A particularly suitable and efficient arrangement of this type comprises a transistor-equipped monostable multivibrator which obtains control impulses derived from a potential which varies in synchronism with the speed of the engine, preferably a potential available at the primary winding of the conventional ignition coil. A multivibrator of this type maintains a certain pulse duration with great accuracy even through long periods of operation and under greatly varying temperatures provided that in accordance with a further feature of the invention a multivibrator comprises not only an input transistor and an output transistor but also a transformer which has a primary winding mounted on a magnetizable core and connected in series with the emitter-collector circuit of the output transistor, while the secondary winding of said transformer is connected via a rectifier in parallel with the resistance arranged in a line connecting the base of the input transistor with the slidable tap of a potentiometer which furnishes a bias potential to the emitter-base circuit of the input transistor, said bias potential being preferably variable in accordance with the rotary speed of the engine.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing in which:

FIG. 4 illustrates a modified schematic circuit diagram for the same purpose;

FIG. 5 is a graph referring to the operation of the above control arrangement;

FIG. 6 is a schematic circuit diagram showing a further modification of a control arrangement;

FIG. 7 is a graph for illustrating the operation thereof;

Figure 1:
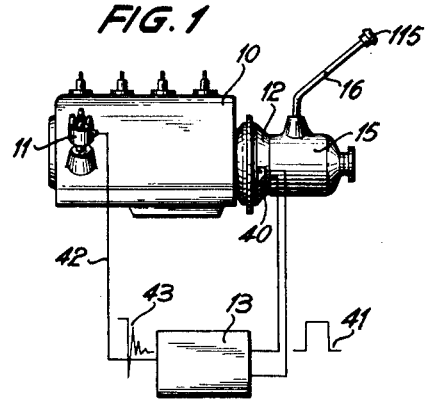
FIG. 1 is a schematic diagram illustrating an arrangement comprising a four-cylinder four-stroke internal combustion engine and an electromagnetic clutch operating with magnetizable powder and electronic control.

Referring now to FIG. 1, an internal combustion engine 10 forming the power plant of a vehicle cooperates with a high voltage ignition arrangement having a distributor 11. The housing 12 of the electromagnetic clutch arrangement is mounted at one end of the engine 10 and is controlled by an electric control arrangement contained in the unit 13, explained in further detail for instance by FIG. 3, in such a manner that the clutch is automatically caused to engage when the rotary speed of the engine has been increased beyond a certain minimum value above the idle speed. The conventional gear box 15 is mounted next to the housing 12 of the clutch and the individual gears may be alternatively placed in operative position by means of a gear lever 16.

Figure 2:
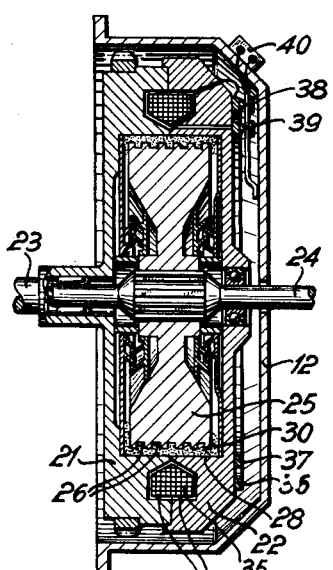
FIG. 2 is an axial section of the electromagnetic clutch of the engine according to FIG. 1.

Referring now to FIG. 2, the electromagnetic clutch described by way of example is of the type which utilizes a magnetizable powder as torque-transmitting material. The clutch according to FIG. 2 comprises a rotor 25 mounted on an output shaft 24, and a hollow rotary member composed of an assembly of two shells 21 and 22 rigidly connected with the end of the crank shaft 23 of the engine and serving at the same time as the fly wheel thereof. The rotor 25 is provided on its cylindrical surface with a plurality of adjacent annular grooves 26. Between this cylindrical surface of the rotor 25 and the cylindrical inner surface 28 of the joined shells 21 and 22 an annular space is provided as shown which usually has a radial width of .040 to .080 inch. The spaces between the shells 21, 22 and the rotor 25 are filled with a magnetizable powder 30 which is forced into the above-mentioned annular space by centrifugal force when the engine is in operation. The adjacent flat faces of the shells 21 and 22 are each provided with an annular groove 31 tapered toward the axis of rotation and thus forming an annular space accommodating the magnet coil 35. The ends of the magnet coil 35 are connected with slip rings 36 and 37 which are insulated from each other and are mounted on the outer face of the shell member 22. Two corresponding brushes 38 and 39, likewise insulated from each other, are mounted on the inner wall of the housing 12. The brushes 38 and 39 cooperate with the slip rings 36 and 37, respectively. The brushes are conductively connected with a terminal block 40 mounted on the outside of the housing 12 and the terminals of the block 40 are connected by cables with the control device 13. As will be explained further below, the control arrangement 13 furnishes the energy for actuating the clutch for the purpose of transmitting the torque, this energy being supplied in the form of approximately rectangular current pulses as indicated at 41 in FIG. 1. For producing these current pulses the input of the arrangement 13 is connected by a cable 42 with the distributor 11 of the high voltage ignition system so that upon the occurrence of every individual ignition a short triggering impulse is applied to the control arrangement 13 as indicated at 43 in FIG. 1.

Figure 3:
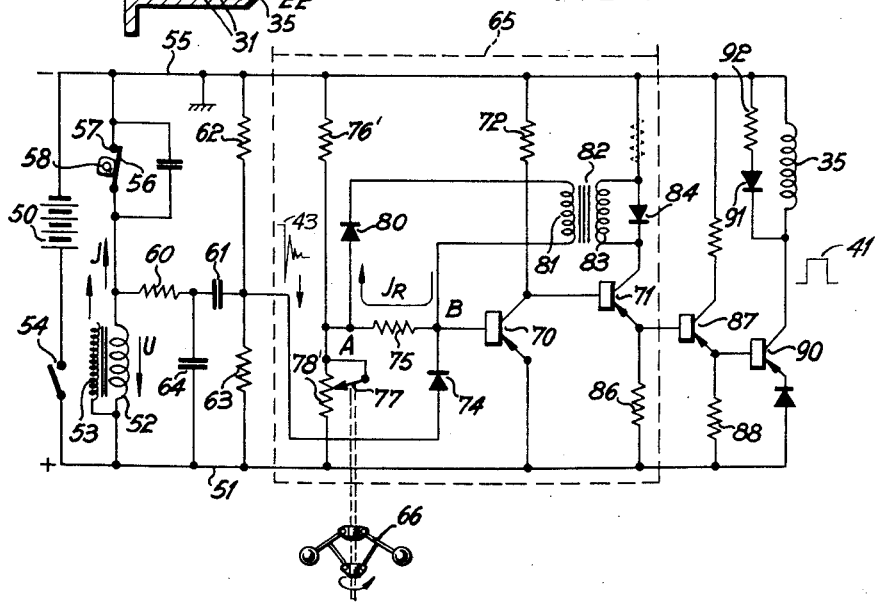
FIG. 3 is a schematic circuit diagram illustrating a control arrangement for actuating and operating the electromagnetic clutch.

As can be seen from FIG. 3, the battery 50 serving to operate the high voltage ignition arrangement may be connected with a plus line 51 leading to the control arrangement according to the invention and also with the primary winding 52 and with the secondary winding 53 of the ignition coil, otherwise not illustrated or described in detail, by means of an ignition switch 54. The primary winding 52 is connected in series with the interrupter arm 56 located in the housing of the distributor 11. The interrupter arm 56 cooperates with a stationary contact 57 connected with the grounded minus line 55 and is operated by a four-lobe cam 58 also arranged in the distributor housing in such a manner that the arm 56 is removed twice during each revolution of the engine from the stationary contact 57. As often as the arm 56 interrupts the ignition current J flowing through the primary winding 52, a voltage U is induced in the primary winding 52 and is transmitted to the multivibrator 65 described further below, via a resistor 60 and via a condenser 61 connected in series therewith. The condenser 61 is connected, on one side, with two series-connected resistors located between the plus line 51 and the grounded minus line 55 of which the resistor 62 may have a value of 10,000 ohms while the resistor 63 may have a value of 5,000 ohms, while on the other side a further condenser 64 of .02 µf. as shown.

The multivibrator 65 comprising the parts encircled by the dotted line is intended to furnish, upon the occurrence of each of the ignition pulses 43 caused by the opening of the interrupter contact arrangement 56, 57 a current impulse 41 for the clutch arrangement, the duration of the impulses 41 depending upon and increasing, in the manner described below, with the speed of the engine in view of the action of the governor 66. The multivibrator arrangement comprises an input transistor 70 and an output transistor 71, both being of the p-n-p-type.

The input transistor 70 is so arranged that its emitter electrode is directly connected with the plus line 51 while its collector is connected directly with the base of the output transistor 71, but also via resistor 72 which may have a value of 8,000 ohms with the negative line 55. The control potentials U occurring upon every opening of the interrupter arrangement 56, 57 are applied to the base of the input transistor 70 via a germanium rectifier 74 which is conductive in this direction. The base of the input transistor 70 is furthermore connected via a resistor 75 which may be of the magnitude of 2,000 ohms with a junction point between a fixed resistor 76' of about 10,000 ohms connected at its other end with the minus line 55, and a variable resistor 78' having a movable tap 77 and connected at its other end with the plus line 51. A further junction point located between the resistors 75, 76' and 78' and marked A in FIG. 3 is further connected with the the input electrode of a germanium rectifier 80. The output electrode thereof is connected with one end of the secondary winding 81 of a transformer which winding is connected at its opposite end with the base B of the input transformer 70. The transformer having the secondary winding 81 carries on a common iron core 82 also a primary winding 83. This primary winding is connected in series with the emitter-collector circuit of the output transistor 71 and is shunted by another germanium rectifier 84. The input electrode thereof is connected to the minus line 55 and a potential is applied to this rectifier in its blocking direction as long as the output transistor 71 is in conductive condition. The emitter of the output transistor 71 is connected with a load resistor 86 of about 1,000 ohms leading to the positive line 51, and also with the base of an amplifier transistor 87. This amplifying transistor has another load resistor 88 of about 20 ohms connected between its emitter and the positive line 51 and the potential developing at the junction point between emitter and load resistor 88 is applied to a power transistor 90 which serves to furnish the current pulses 41 indicated in FIG. 1 from its collector to the magnet coil 35 of the clutch arrangement. For suppressing voltage peaks developing at the end of the current impulses, the magnet coil 35 is shunted by a silicon diode 91 and a resistor 92 of about 10 ohms connected in series therewith.

In operation, the current impulses are produced by the multivibrator 65 in the following manner. Since the input transistor 70 is connected at its base with the junction point A which is negative in relation to the potential of its emitter, the input transistor 70 is able to carry current across its load resistor 72 during normal or idle conditions and thus blocks thereby the output transistor 71 and the depending transistors 87 and 90 which operate inphase therewith. However, as soon as the interrupter arm 56 is lifted from its cooperating stationary contact 57 a strong positive potential is applied to the rectifier 74 so that hereby the input transistor 70 is blocked and the output transistor 71 is rendered conductive. However, the now starting collector current thereof flowing through the primary winding 83 of the transformer can only slowly increase due to the comparatively high inductivity of this primary winding. The correspondingly produced and also only slowly increasing magnetic field in the iron core 82 induces in the secondary winding 81 a voltage which causes the flow of a current $J_R$ flowing through the resistor 75 and the rectifier 80. The voltage drop appearing across the resistor 75 shifts the potential at the base B of the input transistor 70 in the direction toward positive values and holds the input transistor in blocked condition even when the control pulse U produced by the ignition arrangement has already subsided. The blocked condition of the input transistor 70 lasts until the collector current of the output transistor 71 flowing through the primary winding 83 has approached its maximum value to a considerable degree. This is due to the fact that as the rate of increase of the collector current decreases, the voltage induced in the secondary winding 81 decreases and finally becomes smaller than the bias potential of the input transistor 70 which is determined between the junction point A and the plus line 51 by the ratio between the values of the resistors 78' and 76'. When this condition has been reached, the input transistor 70 cannot be kept any longer in its blocked condition and starts again to be conductive. Hereby it blocks increasingly the output transistor 71 so that the feed-back current $J_R$ disappears and the input transistor 70 returns to its fully conductive condition. Simultaneously with the output transistor 71 also the transistors 87 and 90 are placed in blocked condition so that the magnetizing current which up to then was flowing through the magnet coil 35 is discontinued. The just-described cycle starts anew as soon as the interrupter arm 56 is again lifted from its contact 57. The thus produced current impulses 41 follow each other at a frequency which is the greater, the greater is the rotary speed of the engine. The duration of the individual current impulses is practically determined by the time which elapses until the voltage drop across the resistor 75 produced by the decreasing feed-back current $J_R$ becomes smaller than the voltage predeterminedly existing at the resistor 78′. If the bias potential for the input transistor 70 determined at the resistor 78′ were kept at a constant value, then the impulse duration would also be constant. In this case the average magnetic energization of the clutch arrangement could increase only slowly with the increase of the rotary speed of the engine, namely corresponding to the frequency of the pulses. However, in order to cause the magnetization to increase substantially more rapidly the invention provides that with increasing rotary speed of the engine the tap 77 is moved under the action of the governor 66 operated in some mechanical drive connection with the engine, in direction toward that end of the resistor 78′ which is connected with the plus line 51 so that between the junction point A and the plus line 51 an emitter-base potential develops which decreases with increasing rotary speeds. The result of this arrangement is that between the moment of opening the connection between the interrupter contacts 56 and 57 and the moment at which the input transistor 70 returns to its conductive condition and thereby terminates the current impulses 41, a time elapses which increases with increasing rotary speeds of the engine whereby the duration of the current impulses is correspondingly increased.

Referring now to FIG. 4 in which the righthand portion to the right of junction point A is identical with the corresponding portion of FIG. 3, the control by the governor 66 is replaced by an electronical arrangement which, in addition to the above described and desired increase of duration of the current impulses with increasing rotary speed of the engine, is intended to permit an increase of that rotary speed of the engine which is used for starting the vehicle to move, whenever the engine has to operate at low cooling water temperatures. In addition this arrangement provides that at low operating temperatures the engine, in spite of an increased rotary speed provided for the period of starting the motion of the vehicle, operates with full torque transmission at a rotary speed of the engine which is only slightly above the above defined "no-slip" speed of a warmed up engine. That portion of the arrangement of FIG. 4 which replaces the governor arrangement of FIG. 3 is framed by a dotted line 100 and comprises two transistors 101 and 102 connected in amplifying arrangement and a rectifier arrangement which serves to produce a direct current potential which increases with the rotary speed of the engine.

As has been explained already with reference to the embodiment according to FIG. 3, the desired increases of the duration of the current impulses 41 can be obtained by providing for a decrease of the bias potential of the transistor 70 existing between the junction point A and the plus line 51. In the embodiment according to FIG. 4 this decrease of the bias potential is obtained by controlling the transistor 102 in such a manner that with increasing rotary speeds it is rendered increasingly conductive. The collector current $J_c$ of the transistor 102 is taken through a resistor 103 which is connected in series with the resistors 73 and 76. As the collector current $J_c$ increases more and more, the potential at the junction point A approaches more and more the potential of the plus line 51. The control voltage for the transistor 102 is obtained by rectifying the voltage pulses U which are obtained by the operation of the interrupter arm 56. For this purpose a rectifier 105 and a resistor 106 of about 10,000 ohms connected with the primary winding 52 of the ignition coil are provided. A limiting resistor 107 of about 10 kilo-ohms is connected between the output electrode of the rectifier 105 and the base of the transistor 101. The emitter of this transistor is connected with the plus line 51 across an adjustable resistor 108 having a value of about 1,000 ohms. The collector of the transistor 101 is connected with the minus line 55 across a NTC-resistor 110 which is variable depending upon temperature changes and which is mounted in a manner not shown in the circuit diagram so that it is exposed to, and influenced by, the temperature of the circulating cooling water of the engine. The rectifier arrangement serving for producing a speed-dependent control voltage comprises furthermore a voltage divider circuit which is composed of a resistor 112 connected at one end with the negative line 55, and a resistor 113 in series therewith and connected at its other end with the plus line 51. This resistor 113 has also a negative temperature coefficient and is also, like the resistor 110, exposed to, or influenced by, the temperature of the cooling water of the engine. Between the junction point C of the resistors 112 and 113 and the junction point D of the rectifier 105 and the resistor 107 is connected a resistor 114 of about 25,000 ohms and a charging condenser 116 of 25 μf. being connected in parallel with the resistor 114, this condenser being charged to a potential which is the higher, the faster the speed of the engine is and the shorter are the time intervals between each two consecutive contact openings of the interrupter device 56, 57 shown in FIG. 3 but applying also to FIG. 4.

In the graph of FIG. 5 the fully drawn line 120 illustrates how the torque M transmitted by the clutch arrangement varies depending upon the variation of the speed of $n$ r.p.m. of the engine provided that the engine operates at a cooling water temperature higher than 40° C. The dotted line 121 indicates the variation of the transmitted torque depending upon the variation of the speed $n$ of the engine in case that the latter has to operate at low temperatures, e.g. at plus 10° C. or less. Herein it is assumed that an automatic regulating arrangement, not shown in the diagram, raises the idling speed of the engine from a value $n_0$ amounting to about 750 r.p.m. at normal operating temperature to an idling speed $n_0'$ amounting to about 1250 r.p.m. at that lower temperature. Since in this case already the idling speed would be higher than the speed $n_1$ causing engagement of the clutch for starting the movement of the vehicle under normal conditions, a torque would be transmitted already at the raised idling speed whereby the vehicle would be put into motion which is not desired. However, according to the invention and particularly by means of the electronic control arrangement according to FIG. 4, the engagement causing speed at low temperatures is shifted and changed to a value $n_1'$ amounting to about 1500 r.p.m.

This is achieved in the following manner. Since the transistor 102 becomes conductive to a degree which increases as the blocking condition of the transistor 101 is approached due to a raise of potential at the junction point D, so that in this manner also the duration of the current impulses 41 applied to the magnet coil 35 are increased, the temperature response of the voltage divider consisting of the resistors 112 and 113 must be so chosen that the potential at the junction point C also increases when the speed remains unchanged but the temperature of the engine increases. In the present case this is achieved because the resistor 113 has a negative temperature coefficient and therefore has greater conductivity in warm condition than in cold condition. Therefore, e.g. at a speed $n_1'$ of 1500 r.p.m. the engaging and torque transmitting action of the clutch arrangement will just about start provided that the operating temperature is low; in the case of a high operating temperature, however, a substantial torque transmission can be produced already at this same speed. Of course, the same effect can be obtained if instead of the resistor 112 a different resistor is chosen which has a positive temperature coefficient and therefore has a greater conductivity in cold condition than in warm condition. If it is desired to be able to adjust that rotary speed which is intended to be the one at which the increase of pulse duration takes effect, to suit different types of engines, then it is advisable to make the resistor 112 adjustable.

The NTC-resistor 110 connected to the collector circuit of the transistor 101 is the cause of the steeper rise of the curve 121 because the resistivity of this resistor 110 increases with decreasing temperature so that thereby a greater amplification is effected. In this case already smaller values of the potential existing between the junction points C and D and created by the rectifier action will suffice for rendering the transistor 102 conductive to a greater degree.

Referring now to the modification of the invention illustrated by FIG. 6, an improvement or development of the arrangement of FIG. 4 is illustrated thereby, like parts being designated with the same reference numerals, however those connections and elements which differ from the arrangement according to FIG. 4 are emphasized by bold lines. As can be seen from FIG. 6, a further transistor 130 is provided the emitter of which is connected with the collector of the input transistor 70 of the above described multivibrator. The collector of the transistor 130 is connected via a load resistor 131 of about 8,000 ohms with the minus line 55 and is furthermore directly connected with the base of the output transistor 71. A protective resistor 132 of about 20,000 ohms is connected in the base circuit of the transistor 130. The remote end of this resistor 132 is connected with a junction point between the input electrodes of two rectifiers 133 and 134 of which the rectifier 133 is connected via a further rectifier 135 with a movable switch arm 136 cooperating with a stationary contact 137 connected with the minus line 55. It is to be understood although it is not shown in the drawing, that the switch arm 136 is mechanically coupled with a control button 115 mounted at the outer end of the gear shift lever 16 controlling the gear shift 15 as illustrated in FIG. 1. Hereby the contacts 136 and 137 are moved into engagement as soon as the driver grips the button 115 for the purpose of putting a gear into action. The other rectifier 134 connected with the protective resistor 132 is so arranged that its output electrode is connected with the movable switch arm 140 which is normally in engagement with a stationary contact 141 connected directly with the minus line 55. The switch arm 140 is moved from its normally closed position to its open position as illustrated by means of coupling elements, not shown, which are preferably connected with the tachometer shaft of the vehicle so that the contacts 140, 141 are separated as soon as the vehicle exceeds a speed of about 10 miles per hour. As long as the contacts 140, 141 are in engagement, the transistor 130 is conductive and connects the output transistor 71 with the input transistor 70. The multivibrator is then is in a position of furnishing the above described current impulses the duration whereof is determined by the speed-dependent control voltage supplied by the transistors 101 and 102.

However, if the speed of the engine is comparatively high it is possible that the individual control pulses furnished by the ignition arrangement follow each other so rapidly that the arrangement according to the invention, if the speed further increases, might skip every second control signal and would furnish only half the required number of current impulses to the clutch arrangement. In order to avoid this the control of the switch arrangement 140, 141 is such that it assumes open position when the vehicle reaches 10 m.p.h. while the engine, with the gears in lowest transmission, has not yet reached the above mentioned high speed at which the multivibrator would drop to one-half of the proper pulse frequency. By the lifting of the switch arm 140 from the contact 141 the transistor 130 is rendered non- conductive and thereby places the output transistor 71 into a steady conductive condition so that the latter cannot respond to the pulses delivered from the input transistor. The two transistors 87 and 90 remain in this case also steadily conductive and hold the clutch arrangement in engaged position.

When gears are shifted the movable switch arm 136 is moved into contact closing position in which it connects the base B of the input transistor 70 via a resistor 142 of about 400 ohms and a series-connected rectifier 143 with the minus line 55 so that the input transistor 70 cannot be rendered non-conductive by control signals applied thereto via the rectifier 74. In this manner the multivibrator is prevented from producing control impulses. In this case the transistors 71, 87 and 90 are rendered non-conductive even when the speed-dependent switch arm 140 is in non-conductive position because the transistor 130 is provided with base current via its protective resistor 132, the rectifiers 133 and 135 and switch arm 136. By this base current the transistor 130 is rendered conductive and thereby connects the base of the output transistor 71 with the collector of the now conductive input transistor 70.

It can be seen that by the operation described above the clutch arrangement would operate satisfactorily at the beginning of a gear shift. However, difficulties might develop at the end of the gear shift, particularly if a gear shift is carried out for instance from the directly operating third gear down to the second gear in which a greater transmission ratio exists between the crank shaft and the wheels of the vehicle. Namely when in the short period between the gripping of the control button 115 at the beginning of the gear shift operation and the release of this button at the end of this gear shifting operation, the engine has an opportunity to change from its actual speed down to idling speed, then it would be necessary first to accelerate the engine again by giving gas before the gear lever is released. Otherwise the vehicle would be subjected to a sudden and jerking braking action when the slowly rotating engine is placed in torque-transmitting connection with the wheels of the vehicle at the moment when the gear shift lever is released while the coupling arrangement is fully energized immediately so as to go into full engagement.

The arrangements described further below assure a smooth transition of the coupling conditions after the execution of a gear shift. For this purpose two potentiometers 145 and 146 are connected with the switch arm 136, each potentiometer having 1,000 ohms and both being connected at the other end with the plus line 51. Moreover, the tap of the potentiometer 146 is connected via a rectifier 147 to the junction point between a resistor 148 of about 40,000 ohms connected with the collector of the transistor 101 and another resistor 149 of about 10,000 ohms connected with the base of the transistor 102. The just mentioned junction point is also connected with a condenser 150 whose opposite end is connected with the minus line 55. The tap of the other potentiometer 145 is connected via a rectifier 151 with the junction point D located in the base circuit of the transistor 101. A condenser 152 which has 100 μf. exactly as also the condenser 150, is arranged between the minus line 55 and the junction point D. Moreover, the junction point between the rectifiers 135 and 133 located in the base circuits of the transistors 130 and 70, respectively, is connected with a condenser 155 of 100 μf. connected at the other end with the minus line, and with a variable resistor 156 having a maximum resistance of 100,000 ohms whose other end is connected with the plus line 51.

For the purpose of describing below the function of this arrangement it is first to be assumed that the connection which leads from the switch 136 and the rectifiers 135 and 143 to the potentiometers 145 and 146 be interrupted. During the shifting from one gear to the next higher or to the next lower gear the switch arm 136 remains, as described above, in engagement with its contact 137 and thereby in connection with the minus line 55 until the driver, after, completing the shifting into the desired gear, releases the gear shift lever 16. Until close to this moment the condenser 155 remains completely discharged because it is connected with the minus line 55 via the rectifier 135 (conductive in this direction) and the switch arm 136. Consequently, the transistors 70 and 130 are conductive and block the transistor 71 and the transistors 87 and 90 connected therewith so that the clutch cannot transmit any torque. When now the switch arm 136 is lifted upon the release of the control button 115, the transistor 130 remains first in its conductive condition because the condenser 155 tends to be charged across the protective resistor 132 and the rectifier 133; the connection from the base of the input transistor 70 via the resistor 142 and the rectifier 143 is however interrupted because the flow of current would be opposite to the direction of conductivity of the further rectifier 135. On the other hand, the base of the transistor 70 is connected via resistor 75 with the junction point A the potential of which determines the duration of the current impulses which are produced in response to each control pulse 43 applied via rectifier 74 to the base of the input transistor 70.

Since one has to take into consideration that in the operation of the clutching arrangement up to three seconds and even more may pass between the start and the end of a shifting operation so that the engine could easily drop during this period to its idling speed, the control pulses 43 would follow each other at so slow a rate that the clutch would not be able to assume engaged condition. However, in order to be able to develop at least a rather weak magnetic field in the magnetizing coil 35, yet sufficient for taking the engine along, even when the pulse sequence is rather slow, it is necessary to provide for a substantial extension of the impulses produced by the multivibrator. For this purpose, according to FIG. 6, the above mentioned condenser 150 is provided. In order to be able to explain the function of this condenser, it is to be assumed that the tap of the potentiometer 146 is in a position near the end thereof connected with the switch 136. In this case, the condenser is capable to discharge completely during the periods of contact closing position of the switch arm 136. Thus this condenser will tend to assume a charge across the emitter-base-circuit of the transistor 102 and its base resistor 149 in the period beginning with the moment when, upon the release of the control button 115, the switch arm 136 moves to open position; by the charging of the condenser 150 the transistor 102 is kept conductive until the charge potential of the condenser has rendered the base potential of the transistor 102 almost equal to its emitter potential. When the transistor 102 is conductive it holds the potential at the junction point A at a value close to the potential of the plus line 51 and thereby causes a great duration of the magnetizing impulses. This pulse duration decreases with increasing potential at the condenser 150 and causes also a decrease of the duration of the then produced impulses which, however, due to the increasing engine speed follow each other at a faster rate and thereby compensate for the decrease of the pulse duration. By adjusting the tap of the potentiometer 146 one can provide for a certain charge potential which the condenser is to have when the switch arm 136 moves to open position so that the time for charging is reduced.

While the condenser 150 provides a pulse duration which is first long and then becomes shorter, the condenser 152 in cooperation with the rectifier 151 and the potentiometer 145 has the purpose to influence the duration of the magnetizing impulses toward the end of the shifting operation in such a manner that the clutching arrangement assumes without jerking automatically a condition in which it can transmit the full torque. If the tap of the potentiometer 145 is moved near to the end thereof which is connected with the switch 136, the condenser 152 is completely discharged via the switch arm 136 which, during the gear shifting is in its contact-closing position. As soon as the switch arm 136 upon release of the gear shift lever 16 is lifted from the contact 137, the condenser tends to assume charge across the emitter-base-circuit of the transistor 101 and the resistor 107 and keeps thereby the transistor 101 in conductive condition. Under these circumstances the speed-dependent control voltage appearing at the resistor 114 between the junction points C and D remains ineffective until the condenser 152 has assumed a considerable charge. Up to this moment the transistor 101 maintains the transistor 102 in a condition of rather small conductivity determining the shortest possible impulse duration. However, as soon as the condenser 152 is charged the transistor 101 approaches its non-conductive condition in view of the increasingly effective speed-dependent control voltage across the resistor 114, and thereby the transistor 102 is simultaneously rendered more conductive with correspondingly increasing duration of the magnetizing impulses so that a smooth clutching engagement is assured.

The above described phenomena are illustrated in the graph according to FIG. 7. The abscissae are time $t$ while the ordinates are the duration T of the current impulses J which flow to the clutch coil 35. Up to the moment marked $t_1$ which is the moment when the gear shift lever 16 and accordingly the control button 115 are operated for changing gears (provided that the vehicle speed is sufficiently high at least 10 miles per hour), a continuous current J flows which may be considered as a single current impulse the duration of which is very large and practically indefinite. Between the moment $t_1$ and the moment marked $t_2$ which indicates the release of the control button 115 and the end of the gear shift operation, no current impulses can appear as described above because the two transistors 70 and 130 are in conductive condition and hold the transistors 71, 87 and 90 in non-conductive condition. Upon the release of the control button 115 the switch arm 136 is again lifted from its contact 137 and causes the multivibrator again to start operation in response to every control impulse 43 furnished by the ignition arrangement, the condenser 150 causing a considerable increase of the duration of the current impulses J now produced by the multivibrator, up to the moment $t_3$ marked in FIG. 7. From this moment on the current impulses decrease in duration and finally reach the shortest duration of 5 milliseconds. This pulse duration is maintained for a short period of time ranging between .1 and 1 second until at the moment marked $t_4$ the charging operation of condenser 152 is completed to that extent that now the control voltage across resistor 114 which increases with the increase of the engine speed, causes again an increase of the impulse duration until at the moment marked $t_5$ the transistor 130 automatically again causes the flow of a continuous current because at that time also the condenser 155 has been charged to a degree which does not permit the transistor 130 to remain in conductive condition. Hereby the operation of the multivibrator is stopped because now the connection between the input transistor 70 and the output transistor 71 is interrupted by the transistor 130, while simultaneously the transistors 71, 97 and 90 reach their fully conductive condition. As soon as upon another gear shift the switch arm 136 is again placed in conductive connection with the minus line 55, the input transistor 70 as well as the transistor 130 are rendered conductive and block immediately the transistors 71, 97 and 90 for the duration of the shifting operation in the manner described above until then upon the release of the shift lever 16 and of the button 115 the switch arm 136 returns to its open position whereby automatically a smooth gradual engagement of the clutch is effected and the engine is also taken along by the vehicle being in motion.

Figure 8:
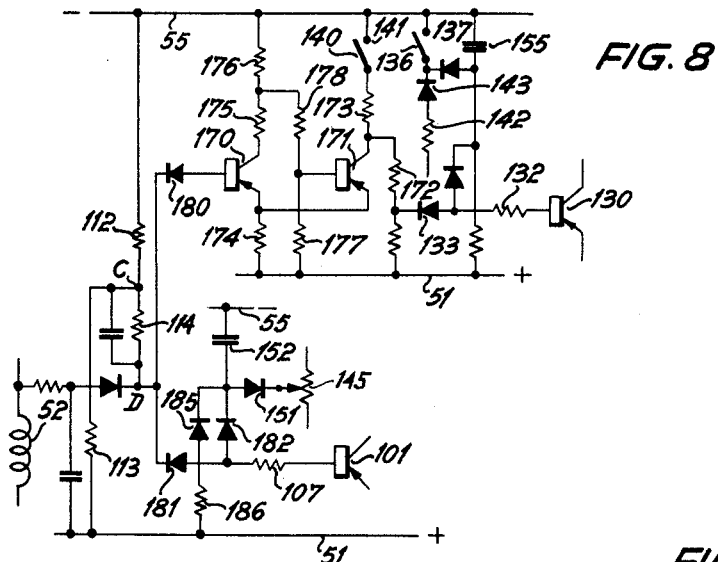
FIG. 8 is a modification of only a portion of the above mentioned control arrangement.

While in the above described embodiments the switch arm 140 is moved depending upon the speed of movement of the vehicle so as to cause the clutch to be fully energized by a continuous current, the modification illustrated by the partial circuit diagram of FIG. 8 furnishes the possibility that the switching to continuous current can be effected by means of the switch 140, 141 depending upon the speed of the vehicle movement, as well as by purely electrical means, namely by means of a switching arrangement comprising the transistors 170 and 171. The switch arm 140 is now connected in the collector circuit of the transistor 171 and is mechanically controlled in the same manner as in the previous embodiment so as to be moved from closed position to open position as soon as the vehicle exceeds a minimum speed of about 10 m.p.h. The transistor 130 which is connected between the transistors 70 and 71 although this is not shown in FIG. 8, is connected, differing herein from the embodiment of FIG. 6, at its base via the protective resistor 132, the rectifier 133 and a resistor 172 of about 20,000 ohms with the collector of the transistor 171, this collector being also connected via a resistor 173 of about 3,000 ohms with the switch arm 140. However, in order to change the transistor 130 to its non-conductive condition also when the switch arm 140 is in closed position on account of a vehicle speed below 10 m.p.h., while the rotary speed of the engine is approaching that value at which the multivibrator would not be able to follow and to respond to the control pulses of the ignition following rapidly each other, the transistor 171 must be rendered conductive. This is effected by the transistor 170 the emitter of which is connected with the emitter of the transistor 171 via a junction point between which and the pulse line 51 a common emitter resistor 174 of 250 ohms is connected. The collector of the transistor 170 is connected with a voltage divider comprising the series-connected resistor 175 of 500 ohms and a resistor 176 of 3,000 ohms which latter is connected with the minus line 55. This voltage divider comprises furthermore a resistor 177 of 3,000 ohms connected with the plus line line 51 and resistor 178 of 10,000 ohms connected with the junction point between the resistors 175 and 176. The junction point between the resistors 177 and 178 is connected with the base of the transistor 171. The base of the normally conductive transistor 170 is connected via a rectifier 180 with the previously mentioned junction point D. This junction point is not only connected with the resistor 114 across which, like in the previous example, a voltage is generated which with increasing rotary speed of the engine raises the potential at the junction point D, but also with the output electrode of a rectifier 181, the input electrode of which is connected via a resistor 107 with the base of the transistor 101. The transistor 101 serves, like in the previous example for amplifying the potential changes appearing across the resistor 114 and to increase thereby, as described above, the duration of the impulses produced by the multivibrator as the engine speed increases. The input electrode of the rectifier 181 is furthermore connected with the input electrode of a rectifier 182. The output electrode thereof is connected, on one hand, with one side of the condenser 152 which is connected at its other side with the minus line 55, and, on the other hand, with the input electrode of the recifier 151 which is connected at the other side with the tap of the potentiometer 145. From the plus line 51 is taken a connection to the junction point between the rectifiers 151 and 182, this connection comprising a rectifier 185 conductive in the direction to the junction point and a resistor 186.

As long as the rotary speed of the engine is low only a low voltage is created across the resistor 114 and is superimposed over the voltage appearing at the junction point between the resistors 112 and 113 whereby the potential of the junction point D is shifted towards positive values. When the rotary speed of the engine increases considerably and a sufficiently high voltage is created across the resistor 114 the transistor 170 is blocked and thereby renders the transistor 171 conductive. Should at this moment the switch arm 140 be in its contact closing position because the vehicle speed is below 10 m.p.h., then the transistor 130 is thereby blocked and the transistors 71, 87 and 90 controlled thereby are caused to carry a continuous current.

Figure 9:
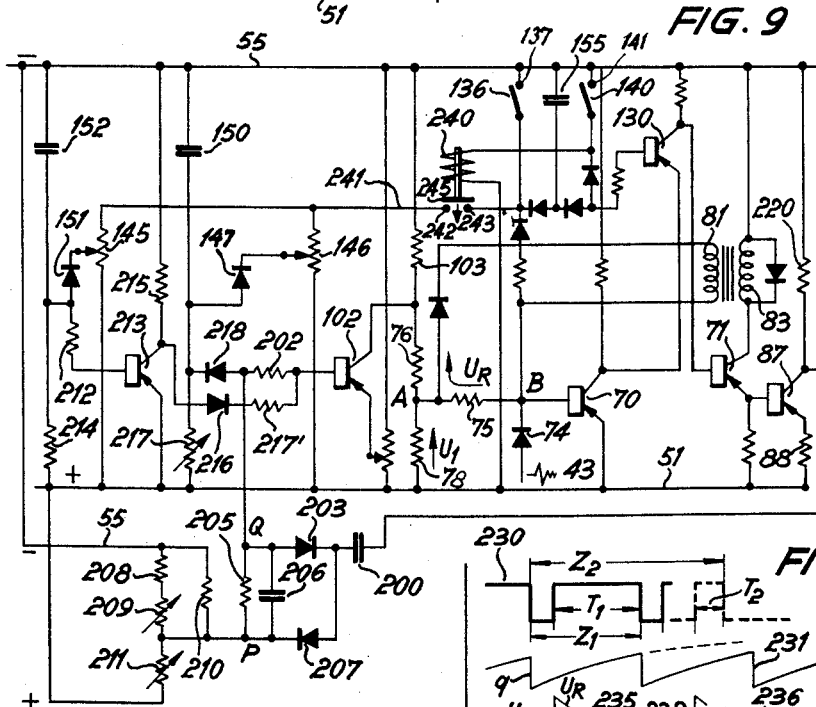
FIG. 9 illustrates a further modification of a control arrangement in which the increase of the pulse duration is obtained electronically.

While in the above described examples and embodiments the control impulses derived from the ignition arrangement have been used for increasing, with increasing engine speed, also the duration of the individual current impulses J produced by the multivibrator, in the following embodiment according to FIG. 9 the arrangement is such that each impulse in the sequence of pulses is used for increasing the duration of the immediately following impulse provided that this next impulse follows rapidly in view of a high engine speed, or to decrease the duration of the next following impulse whenever the rotary speed is small. The control arrangement according to FIG. 9 comprises a great number of components and connections which in their arrangement and function correspond to those illustrated in FIGS. 1 to 8 and which are therefore indicated by the same reference numerals. In FIG. 9, for the sake of clarity of the drawing, the power transistor 90 connected with the transistor 87 is not illustrated. As in the previous examples the input transistor 70 of the multivibrator is blocked by each of the control impulses 43 applied thereto via the rectifier 74. This transistor becomes again conductive as soon as the voltage produced in the secondary winding 81 of the transformer has dropped to such an extent that the voltage drop $U_r$ appearing across the resistor 75 does not exceed any more the voltage difference $U_1$ between the potential of the junction point A and the potential of the plus line 51. The duration of the impulses produced in this manner increases the more, the closer the potential of the junction point A is to the potential of the plus line 51. However, this potential is influenced by the transistor 102 in the following manner depending upon the rotary speed of the engine.

For this purpose the collector of the transistor 87 which is strongly conductive during the individual current impulses, is connected with a condenser 200 of 1 μf. The other side of the condenser 200 is connected with the base of the transistor 102 via a resistor 202 of 2000 ohms and a rectifier 203 which is conductive in direction toward the condenser 200. The junction point Q between the resistor 202 and the rectifier 203 is connected with a parallel combination of a resistor 205 of about 30,000 ohms and a condenser 206 of 1 μf. The other end P of this parallel combination is connected with the output electrode of a rectifier 207 the input electrode whereof is connected as well as the output electrode of the condenser 203 with the above mentioned other side of the condenser 200. The terminal point P is connected with the minus line 55 by another parallel combination of a resistor 210 and a series combination of a resistor 208 of 50 ohms and a NTC-resistor 209 of 1,500 ohms, while point P is further connected with the plus line 51 through an adjustable resistor 211 of about 40 ohms.

In the same manner as in the example according to FIG. 6, a condenser 150 and a condenser 152, each having 100 μf. and a pertaining potentiometer 145 and 146, respectively, and rectifiers 151 and 147, respectively, are provided for producing a smooth clutch engagement in the course of gear shifting and for causing a variation of the duration of the current impulses J applied to the clutching arrangement in the manner illustrated by the curves in FIG. 7. As has been explained already further above, the charging characteristic of the condenser 150 serves to reduce the duration of the impulses between the moments $t_3$ and $t_4$, while the charging of the condenser 152 is utilized for increasing again the impulse duration from the moment $t_4$ on until at the moment $t_5$, provided that the moving speed of the vehicle is sufficiently high, the impulses 41 are changed into a continuous current.

From the condenser 152 a connection containing a resistor 212 of 10,000 ohms is taken to the base of a transistor 213 while a resistor 214 of 50,000 ohms is connected between the plus line 51 and a junction point between condenser 152 and resistor 212. The collector electrode of the transistor 213 is connected with a resistor 215 of 5,000 ohms which is at its other end connected with the minus line 55, and with the input electrode of a rectifier 216 the output line whereof is connected via a resistor 217' with the base of the transistor 102. The other condenser 150 is connected via a variable resistor 217 of about 50,000 ohms with the plus line 51. Arranged in the connection from the junction point Q to the condenser 150, to the rectifier 147 and to the resistor 217 is a rectifier 218 which is conductive in the direction shown and which serves to prevent that during switching operations by the closing of the contact combination 136, 137 undesirable interference effects influence the potential between the points P and Q which determines the impulse duration.

Figure 10:
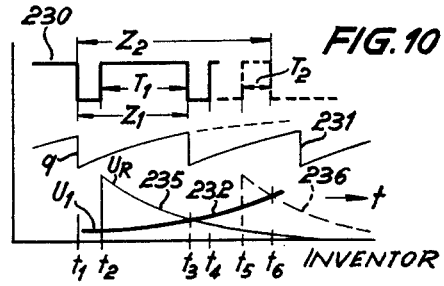
FIG. 10 is a graph illustrating the operation of the embodiment according to FIG. 9.

For the purpose of explaining the operation of this arrangement it is first assumed that the engine is operating at a constant rotary speed at which a switching to continuous current has not yet occurred so that the multivibrator produces one current impulse for every ignition pulse. This is illustrated by FIG. 10 in which it is assumed that at the moment $t_1$ the current flowing through the transistor 87 which is illustrated by the curve 230 ends with a very steep trailing flank because the transistor 87 is blocked at this moment. Up to this moment the transistor 87 has been fully conductive; however, the condenser 200 was enabled thereby to discharge fully except for an insignificant residual charge, because it was connected, on one hand, with the minus line 55 via the very low-resistance resistor 210 and the rectifier 207, and on the other hand, via the low-resistance emitter-resistor 88 and the conductive emitter-base circuit of the transistor 87 with the common plus line 51. At the moment $t_1$ the transistor 87 approaching non-conductivity renders the potential at the plate of the condenser connected to its collector almost equal to the potential of the minus line 55. However, since the condenser 200 cannot be charged via the rectifier 207 its charging current must be furnished via the resistor 205, the condenser 206 and the rectifier 203 which offers practically no resistance. The junction point Q therefore immediately reaches a very low potential and renders the transistor 102 fully conductive while the condenser 206 is immediately strongly charged. From the moment $t_1$ on the condenser 206 is capable of discharging continuously across the resistor 205 so that the potential $q$ of the junction point Q varies as indicated by the curve 231 in FIG. 10. With increasing potential at the junction point Q the current flowing through the resistor 103 and the transistor 102 slowly decreases so that the voltage $U_1$ across the resistor 76 can also increase only slowly in the manner indicated by the curve 232. If now at the moment $t_2$ the transistor 70 is blocked by the next-following control pulse 43 and thereby the transistor 71 is rendered conductive, then across the primary winding 83 a current increasing exponentially on account of the inductivity of the winding starts to flow. The magnetic field produced by the current induces in the secondary winding 81 of the transformer a voltage which causes a flow of current via the resistor 75. Consequently, a voltage $U_R$ appears across the resistor 75 as illustrated by the curve 235 in FIG. 10, whereby the transistor 70 is kept blocked until this voltage has dropped in the manner illustrated by curve 235 to a point where it is smaller than the then existing slowly rising voltage $U_1$. As shown in FIG. 10, the curves 232 and 235 intersect at a moment which is marked $t_3$. At this moment the transistor 70 becomes again conductive and blocks the transistor 71 and thereby also the further transistors 87 and 90. Thus, the current impulse is again terminated at the moment $t_3$. Its duration $T_1$ extends from the moment $t_2$ to the moment $t_3$, while the impulse period is indicated by $Z_1$. At the moment $t_3$ the above described cycle starts again and repeats, the moment $t_4$ being the moment when the next following control pulse 43 blocks the transistor 70 for producing the next-following current impulse not shown in the diagram of FIG. 10.

In the above consideration it has been assumed that the control pulses 43 follow each other comparably rapidly. If, however, the engine rotates rather slowly, also the control impulses 43 will follow each other at a slower rate. At a very low rotary speed the next-following control pulse would be therefore produced only at the moment $t_5$. Then the voltage $U_R$ varying according to line 235 would appear in the graph FIG. 10 shifted considerably towards right as indicated by the broken line 236. Since, however, the voltage $U_1$ has increased considerably in the meantime on account of the increasing discharge of the condenser 206, the voltage $U_R$ becomes lower than the voltage $U_1$ already at a moment $t_6$ which is indicated by the intersection of the curves 232 and 236. The current impulse produced in this manner is therefore of very short duration $T_2$ and has then the form as indicated by dotted lines. It starts at the moment $t_5$. The corresponding pulse period i.e. the interval between consecutive pulses, is indicated in FIG. 10 by $Z_2$. One can therefore clearly see from this graph that at low speeds a very small impulse duration $T_2$ is associated with a long impulse period $Z_2$. At high rotary speeds however the impulse period $Z_1$ is substantially shorter, while the impulse duration $T_1$ is considerably greater so that the desired substantial increase of the impulse duration with increasing rotary speed is hereby assured. It is possible to arrange matters accordingly in such a way that only a very narrow area is to be provided between idling speed and the speed required for starting the movement of the car, with no torque being transmitted by the clutch during this interval, while the range of rotary speeds in which the clutch reaches the condition of transmitting the full torque, may be arranged to be comparatively large so that a very smooth and soft clutch engagement is effected.

In the embodiment according to FIG. 9 the behavior of the clutch arrangement in the period of starting the movement of the vehicle is further improved by an additional relay. This relay has a relay winding 240 which is connected at one of its ends with the switch arm 140. As in the previous examples, this switch arm is moved into open position depending upon the speed of movement of the vehicle, namely when this speed exceeds 10 miles per hour. The other end of the relay winding 240 is directly connected to the plus line 51. The relay controlled contacts 242 and 243 are arranged in the connection 241 which connects the switch arm 136 operated by the control button 115 with the potentiometers 145 and 146. The bridging armature contact 245 of the relay connects the contacts 242 and 243 as long as the switch connection 140, 141 is in open position. However, this condition occurs only when the speed of the vehicle exceeds 10 miles per hour. Then the condensers 150 and 152 can produce a soft and smooth clutch engagement in the manner described and illustrated by FIG. 7, as it is necessary when the gear shift lever 16 after the switching into another gear is released.

It will be understood that each of the elements described above, or two or more together, may also find a useful application in other types of electromagnetic clutch arrangements differing from the type described above.

While the invention has been illustrated and described as embodied in an electromagnetic clutch arrangement including electric pulse generator means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics and, therefore, such adaptations should and are intended to be comprehended within the meaning and range of equivalence of the following claims.

What is claimed as new and desired to be secured by Letters Patent is:

1. In an electromagnetic clutch arrangement for connecting the engine of a motor vehicle with its power train, in combination, electromagnetically activable clutching members, one thereof being connected with the engine, another one thereof being connected with the power train, and adapted to transmit torque between the engine and the power train upon application of electric energy to at least one of said clutching members; electric pulse generator means connected in circuit with said one clutching member for creating and for applying to said one clutching member electric energizing pulse sequences of varying pulse frequency and variable pulse duration for energizing said clutching member to a degree depending upon the pulse duration and on the frequency of said pulses, said pulse duration varying with the pulse frequency; and pulse frequency determining means (56—58) operatively connected with the engine and including electrical means in circuit with said pulse generator means for furnishing control pulses thereto and for causing said pulse frequency and said pulse duration of the energizing pulse output thereof to increase with an increase of the rotary speed of the engine.

2. An arrangement as claimed in claim 1, wherein said pulse generator means comprise multivibrator means (65) producing said energizing pulses and including an input transistor (70) and an output transistor (71), biasing means (77, 78', 78, 100) for providing said input transistor (70) with a variable bias potential in proportion with varying speeds (66) of the engine, transformer means (82) having a primary winding (83) connected in series with the emitter-collector circuit of said output transistor (71), the secondary winding (81) of said transformer (82) and a rectifier (80) constituting a series combination, and a resistor (75) being connected in parallel with said series-combination and also between said biasing means (78, 78') and the base of said input transistor 70.

3. An arrangement as claimed in claim 1, comprising temperature-responsive correcting means (113) arranged to be exposed to varying temperatures of a portion of the engine and connected in circuit with said pulse frequency determining means for increasing, when said portion of the engine is at low temperature thus calling for a higher idling speed, the critical speed, at which engagement of said clutching members is to be effected, and for reducing the speed gap between said critical speed and the "no slip" speed of the clutch arrangement.

4. An arrangement as claimed in claim 2, including a temperature-dependent resistor means (113) cooperating with said biasing means and arranged to be able to respond to the temperature of the engine and connected in said pulse generator means for varying the pulse duration by influencing said bias potential.

5. An arrangement as claimed in claim 4 wherein a voltage divider arrangement (112—114) is provided of which said temperature-dependent resistor means (113) is a component, amplifying transistor means (101, 102) being connected with said voltage divider, and pulse-time determining means (114, 116) being connected between said voltage divider arrangement (112—114) and said amplifying transistor means (101, 102), said pulse-time determining means (114, 116) being connected with said pulse frequency determining means (56—58) for being supplied with a sequence of said control pulses (43) at a pulse frequency increasing with increasing engine speeds and for furnishing accordingly said bias potential in such a manner that it increases with the engine speed.

6. An arrangement as claimed in claim 5, including a second temperature-dependent resistor (110) arranged to be able to respond to the temperature of the engine and operatively connected with said amplifying transistor means (101, 102) for decreasing the amplification effect thereof with increasing engine temperature.

7. An arrangement as claimed in claim 6, including additional means for varying the duration of said pulses produced by said multivibrator by varying said bias potential for said input transistor (70), said means for varying said bias potential including a series-combination of a first resistor (78) connected in the base-circuit of said input transistor (70), and a second resistor (103) constituting the load resistance of said amplifying transistor means (101, 102), said series-combination of said first and second resistors (103, 78) being connected between the terminals of an outside source (50) of constant operating electric energy.

8. An arrangement as claimed in claim 7, wherein said pulse frequency determining means (56—58) are the ignition arrangement of the engine so that said control pulses applied to said pulse-time determining means are derived from pulses occurring in said ignition arrangement during operation of the engine.

9. An arrangement as claimed in claim 8, wherein said pulse generating means include control means (75, 80—83) for deriving from pulses produced by said multivibrator means (65) a current ($J_R$) producing a control voltage across said control means (75) for varying the pulse duration by varying said bias potential.

10. An arrangement as claimed in claim 9, wherein said pulse-time determining means, comprises a parallel combination of a condenser (116, 206) and a resistor (114, 205), for regulating the duration of said control pulses.

11. An arrangement as claimed in claim 10, wherein said pulse-time determining means include two series-connected diodes (203—207) connected in parallel with said condenser (206) of said parallel-combination and further condenser means (200) connected between the junction point between said two diodes (203, 207) and the output of said multivibrator means for applying the impulses furnished by said multivibrator means to said pulse-time determining means (205, 206).

12. An arrangement as claimed in claim 11, including a second voltage-divider arrangement (208—211) comprising at least one temperature-dependent resistor (209) and connected between the terminals of said outside source (50) of constant electrical energy, said resistor (205) forming part of said pulse-time determining means (205, 206) being connected with a junction point within said second voltage-divider arrangement (208—211) and with the input of said multivibrator means for determining the potential at said input (A) of said multivibrator means.

13. An arrangement as claimed in claim 12, wherein said amplifying transistor means comprise a first (101) and a second amplifying transistor (102) connected in tandem, said second amplifying transistor (102) being connected at its base with said resistor (205) forming part of said pulse-time determining means (205, 206), and wherein a third resistor (76) is series-connected with said first and second resistors (78, 103) to form a second voltage-divider arrangement connected between the terminals of said outside source (50) of constant electric energy, the emitter-collector circuit of said second amplifying transistor (102) being connected in parallel with a portion (76, 78) of said second voltage-divider arrangement in such a manner that said bias potential of said input transistor (70) being variable by said series-combination of said first (78) and second (103) resistors is additionally influenced by the output of said second amplifying transistor (102).

14. An arrangement as claimed in claim 13, including vehicle speed-controlled switch means (140, 141) connected for rendering said multivibrator means inoperative when the vehicle exceeds a predetermined speed, and output amplifier transistor means (87, 90) furnishing the output of said output transistor (71) of said multivibrator means to said one of said electromagnetically activable clutch members (35) and connected with said switch means (140, 141), said switch means (140, 141) rendering said output amplifier transistor means (87, 90) steadily conductive when said predetermined vehicle speed is exceeded.

15. An arrangement as claimed in claim 14, including a further transistor (130) connected at its base with said speed-controlled switch means (140, 141), while its emitter is connected with the collector of said input transistor (70), and its collector is connected with the base of said output transistor (71) of said multivibrator means, a load resistor (131) being additionally connected between the collector of said further transistor (130) and one terminal of said outside source (50) of constant electric energy.

16. An arrangement as claimed in claim 15, including a gear-shift-controlled switch means (136, 137) for interrupting the application of electric energy to said one clutch member (35) as long as the gear shift lever (16) is operated by the driver, and control means (150, 152) adapted to influence the duration of said energizing pulses (41) produced by said multivibrator means and adapted to be put into effect by operation of said gear-shift-controlled switch means (136, 137) for causing, when said gear shift lever (16) is released, said multivibrator means to produce, irrespective of the engine speed and of the vehicle speed energizing pulses (41) of comparatively long duration, sufficient to produce at least one half of the full torque transmission effect in the clutch arrangement.

17. An arrangement as claimed in claim 16, said control means including at least one control condenser (150, 152) connected for influencing the bias potential of said amplifying transistor means (101, 102) and changeable when said gear-shaft-controlled switch means (136, 137) is in closed position while said gear shift lever (16) is being operated, and dischargeable when said shift lever (16) is released and said switch means (136, 137) controlled thereby is moved to open position.

18. An arrangement as claimed in claim 17, including at least one third voltage-divider means (145, 146) connected with at least said one control condenser (150, 152) for determining a predetermined minimum change potential at said control condenser (150, 152) when said gear-shift-controlled switch means (136, 137) is in closed position.

19. An arrangement as claimed in claim 15, including torque-controlling means (146, 150) becoming effective after the completion of a gear-shift operation for reducing the clutch-transmitted torque for a predetermined time period to a predetermined fraction of the maximum transmittable torque so that a jerk-free engagement of the clutch arrangement upon release of the gear-shift lever is assured.

20. An arrangement as claimed in claim 17, wherein said control means (150, 152) cooperating with said gear-shift-controlled switch means (136, 137) are connected to effect first application of a sequence of said energizing pulses (41) to said clutching member (35) during a predetermined time period after the gear-shift lever (16) has been released and said gear-shift-controlled switch means (136, 137) is moved to open position, and to effect after a delay ranging between .1 and 1 second the application of continuous current to said clutch member (35).

21. An arrangement as claimed in claim 20, wherein said control means (150, 152) are connected for automatically reducing the duration of said energizing pulses (41), during said predetermined time period of pulse application, from a comparatively long duration to a comparatively short duration.

22. An arrangement as claimed in claim 21, wherein with said speed-controlled switch means (140, 141) is connected an electronic switching circuit means cooperating therewith for automatically, when the engine speed exceeds a predetermined minimum, influencing said multivibrator means so as to extend the energizing pulse duration indefinitely so that electric energy is applied to said one clutching member (35) continuously.

23. An arrangement as claimed in claim 22, wherein said switching circuit means comprises a bistable flip-flop means (170, 171) of the Schmitt-Trigger type.

24. An arrangement as claimed in claim 23 comprising delay time-determining means including a condenser (155) and a resistor (156) for delaying the transition from pulse application to continuous current application to said one clutching member (35) only if during actuation of the gear-shift lever (16) said gear-shift-controlled switch means (136, 137) is moved to closed position.

25. An arrangement as claimed in claim 24, including a rectifier (135) connected between said gear-shift-controlled switch means (136, 137) and said condenser (155) forming part of said delay time-determining means and conductive in direction toward said gear-shift controlled switch means (136, 137), and another rectifier (133) connected between said speed-controlled switch means (140, 141) and said condenser (155) forming part of said delay time-determining means and non-conductive in direction toward said speed-controlled switch means (140, 141).

References Cited in the file of this patent
UNITED STATES PATENTS

| | | |
|---|---|---|
| 2,253,842 | Brotman | Aug. 26, 1941 |
| 2,910,884 | Peras | Nov. 3, 1959 |